(12) United States Patent
Cund et al.

(10) Patent No.: US 9,947,225 B2
(45) Date of Patent: Apr. 17, 2018

(54) APPARATUS AND METHOD FOR MONITORING A TARGET OBJECT

(75) Inventors: Mark Cund, Coventry (GB); Paul Widdowson, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 555 days.

(21) Appl. No.: 13/985,107

(22) PCT Filed: Feb. 20, 2012

(86) PCT No.: PCT/EP2012/052836
§ 371 (c)(1),
(2), (4) Date: Jan. 27, 2014

(87) PCT Pub. No.: WO2012/110655
PCT Pub. Date: Aug. 23, 2012

(65) Prior Publication Data
US 2014/0125473 A1    May 8, 2014

(30) Foreign Application Priority Data

Feb. 18, 2011    (GB) .................................. 1102819.8

(51) Int. Cl.
*G08G 1/16*    (2006.01)
*B60T 7/22*    (2006.01)
(Continued)

(52) U.S. Cl.
CPC .............. *G08G 1/166* (2013.01); *B60T 7/22* (2013.01); *B60W 30/09* (2013.01); *G01S 7/415* (2013.01);
(Continued)

(58) Field of Classification Search
CPC . B60Q 1/525; B60Q 1/52; B60Q 1/54; B60Q 9/008; G08G 1/16; G08G 1/163; G08G 1/166
See application file for complete search history.

(56) References Cited

U.S. PATENT DOCUMENTS 4,833,469 A    5/1989    David
5,173,859 A *  12/1992   Deering .......................... 701/70
(Continued)

FOREIGN PATENT DOCUMENTS

GB    2276998 A    10/1994
JP    08329399 A   12/1996
(Continued)

OTHER PUBLICATIONS

International Search Report for International application No. PCT/EP2012/052836 dated Jun. 6, 2012.

*Primary Examiner* — Hongmin Fan
(74) *Attorney, Agent, or Firm* — Carlson, Gaskey & Olds

(57) ABSTRACT

Embodiments of the present invention provide monitoring apparatus for monitoring a target object external to a vehicle. The apparatus is operable to determine whether the target object is a valid target object in dependence on a value of a maximum range $R_{max}$ from the vehicle at which the target object has been detected. The apparatus may be operable to pre-arm a braking system and optionally apply a braking system responsive to a determination that a risk of collision exists.

20 Claims, 2 Drawing Sheets

(51) Int. Cl.
  *B60W 30/09* (2012.01)
  *G01S 7/41* (2006.01)
  *G01S 13/93* (2006.01)

(52) U.S. Cl.
  CPC ........ *G01S 13/931* (2013.01); *B60W 2420/52* (2013.01); *B60W 2520/10* (2013.01); *B60W 2550/302* (2013.01); *B60W 2550/308* (2013.01); *G01S 2013/9346* (2013.01)

(56) References Cited

U.S. PATENT DOCUMENTS

| | | |
|---|---|---|
| 5,627,511 A | 5/1997 | Takagi et al. |
| 5,995,037 A | 11/1999 | Matsuda et al. |
| 6,009,368 A | 12/1999 | Labuhn et al. |
| 6,191,704 B1 | 2/2001 | Takenaga et al. |
| 6,653,935 B1 | 11/2003 | Winner et al. |
| 2003/0173128 A1 | 9/2003 | Kuroda et al. |
| 2004/0117090 A1* | 6/2004 | Samukawa et al. ............ 701/45 |
| 2004/0257556 A1 | 12/2004 | Samukawa et al. |
| 2005/0216167 A1 | 9/2005 | Nozawa et al. |
| 2012/0203438 A1* | 8/2012 | Breuer et al. .................. 701/70 |

FOREIGN PATENT DOCUMENTS

| | | |
|---|---|---|
| JP | 2000035479 A | 2/2000 |
| JP | 2001227944 A | 8/2001 |
| JP | 2003019936 | 1/2003 |
| JP | 2004114277 A | 4/2004 |
| JP | 2005199802 | 7/2005 |
| JP | 2007223582 | 9/2007 |
| JP | 2009262698 | 11/2009 |
| JP | 2010091317 | 4/2010 |
| WO | 03062020 A2 | 7/2003 |

* cited by examiner

APPARATUS AND METHOD FOR MONITORING A TARGET OBJECT

FIELD OF THE INVENTION

The present invention relates to apparatus and a method for monitoring a target object external to a vehicle. In particular but not exclusively the invention relates to apparatus and a method for monitoring a target object and confirming that the object is a valid target object based on monitored behaviour of the object.

BACKGROUND

It is known to provide a vehicle having apparatus arranged to identify target objects in front of or behind the vehicle and to activate automatically a braking system of the vehicle if the vehicle determines that collision with the object is imminent.

Such systems typically include radar or ultrasonic transmitter/receiver modules and employ the well-known doppler effect to determine a range R and rate of change of range (or 'range rate') R' of the object from the vehicle.

It is desirable to provide improved apparatus to increase the likelihood that the apparatus will identify a target object that represents a collision risk.

STATEMENT OF THE INVENTION

Embodiments of the invention may be understood by reference to the appended claims.

Aspects of the invention provide motor vehicle brake control means, a motor vehicle and a method.

In a further aspect of the invention for which protection is sought there is provided monitoring apparatus for monitoring a target object external to a vehicle, the apparatus being operable to determine whether the target object is a valid target object responsive to (a) a determination as to whether a rate of change of the range of the target object from the vehicle is less than the speed at which the vehicle is moving; and (b) the maximum range $R_{max}$ from the vehicle at which the target object has been detected.

In an aspect of the invention for which protection is sought there is provided monitoring apparatus for monitoring a target object external to a vehicle, the apparatus being operable to determine whether the target object is a valid target object in dependence on a value of a maximum range $R_{max}$ from the vehicle at which the target object has been detected.

Thus it is to be understood that the apparatus may be arranged to trigger one or more responses by the vehicle to behaviour of the target object only if it is determined to be a valid target object.

In some embodiments, by valid target object is meant a target object representing a collision threat to the vehicle, i.e. a target object with which there is a risk of collision of the vehicle.

In an embodiment the apparatus is operable to determine whether the target object is a valid target object in further dependence on a determination as to whether a rate of change of the range of the target object from the vehicle is less than the speed at which the vehicle is moving.

It is to be understood that in order for a target object to be considered a valid target object it must meet the condition that the target object is moving in a direction away from the vehicle but the range of the target object from the vehicle is decreasing.

Thus, the apparatus will not allow a stationary object to be identified as a valid target object because the stationary object will (by definition) not have a direction of travel.

Thus, if the apparatus identifies a stationary object as a target object the apparatus will not permit the stationary object to be validated as a valid target object. Thus the stationary object is not permitted to trigger the one or more responses.

For example, if apparatus according to an embodiment of the invention identifies a stationary object to be a target object, such as a stationary utility services cover over which the vehicle may freely drive, the cover will not be validated as a valid target object because it is stationary and not moving.

Furthermore, the apparatus will not determine that a target object is a valid target object if the target object is moving towards the vehicle.

In an embodiment the apparatus is arranged to determine whether the target object is a valid target object in dependence on the length of time t for which the target object has remained a target object.

This feature has the advantage that the risk that the target object is determined to be a valid target object when in fact it is not may be further reduced.

In an embodiment t is the length of time for which the target object has continuously remained a target object.

The apparatus is optionally operable to set a first valid target object flag when $R_{max}$ exceeds a first prescribed value.

Thus, a target object must have been detected a distance of at least a first prescribed value from the vehicle in order to be classified as a valid target object. This feature has the advantage that it reduces a risk that the target object is determined to be a valid target object when in fact it is not.

The present inventors have identified that by requiring a target object to have been detected a distance of at least the first prescribed value from the vehicle, a risk that a target object that is not a valid target object is incorrectly classified as a valid target object may be reduced considerably.

The apparatus may be arranged to set the first valid target object flag only when the further condition is met, that is, when t exceeds a first prescribed value.

In an embodiment the apparatus is operable to set a second valid target object flag when $R_{max}$ exceeds a second prescribed value.

In an embodiment the second prescribed value of $R_{max}$ is greater than the first prescribed value.

The apparatus may be operable to set the second valid target object flag only when the further condition is met, that is, when t exceeds a second prescribed value.

In an embodiment the second prescribed value of t is greater than the first prescribed value.

The apparatus may either comprise or be provided in combination with range determination means operable to determine the range R of the target object from the vehicle and the rate of change of the range R'.

The range determination means may comprise a radar transmitter and a radar receiver, the apparatus being arranged to determine the range of the target object from the vehicle by means of a radar signal transmitted from the transmitter and received at the receiver following reflection by the target object.

Alternatively or in addition the range determination means may comprise an ultrasonic transmitter and an ultrasonic receiver, the apparatus being arranged to determine the range of the target object from the vehicle by means of an ultrasonic signal transmitted from the transmitter and received at the receiver following reflection by the target object.

In a further aspect of the invention for which protection is sought there is provided a vehicle comprising an apparatus according to the previous aspect of the invention.

In an embodiment, in response to setting of the first valid target object flag the vehicle is operable automatically to pre-arm a brake of the vehicle responsive to a determination that a risk of collision exists.

Pre-arming of the brakes has the advantage that if the brakes are subsequently applied by the driver or by the vehicle automatically, a time period between application of the brakes and braking action on the vehicle being achieved may be reduced.

In an embodiment, in response to the second valid target object flag the vehicle is operable automatically to apply the brake of the vehicle thereby to slow the vehicle responsive to a determination that a risk of collision exists.

In a still further aspect of the invention for which protection is sought there is provided a method of determining whether a detected target object is a valid target object comprising the steps of: determining by means of monitoring apparatus whether the target object is a valid target object responsive to (a) a determination as to whether a rate of change of the range of the target object from the vehicle is less than the speed at which the vehicle is moving; and (b) the maximum distance $R_{max}$ the target object has been detected from the vehicle.

In one aspect of the invention for which protection is sought there is provided a method of determining whether a detected target object is a valid target object comprising the steps of: determining by means of monitoring apparatus whether the target object is a valid target object responsive to the maximum range $R_{max}$ from the vehicle at which the target object has been detected.

In an embodiment the step of determining by means of monitoring apparatus whether the target object is a valid target object comprises the step of determining whether a rate of change of the range of the target object from the vehicle is less than the speed at which the vehicle is moving.

In another aspect of the invention for which protection is sought there is provided a motor vehicle comprising an apparatus arranged to determine whether a detected target object represents a collision threat to the vehicle, the apparatus being configured to determine that the target object is a valid target object representing a collision threat when a set of one or more conditions is met, the set of one or more conditions including the condition that the target object has been detected at least a first prescribed distance from the vehicle.

In a further aspect of the invention for which protection is sought there is provided a motor vehicle comprising means for detecting an object external to the vehicle for the purpose of reducing a risk of collision with the object, the apparatus being arranged to determine that a detected object is a valid target object to be considered a potential collision threat to the vehicle when a set of two or more conditions is met, the set of two or more conditions including the condition that a rate of change of the range of the target object from the vehicle is less than the speed at which the vehicle is moving and the condition that the target object has been detected at least a first prescribed distance from the vehicle. The apparatus may be configured to provide an output responsive to the determination whether the target object is a valid target object.

It is to be understood that by collision threat is meant that the possibility exists that the vehicle will collide with the target object unless action is taken to prevent collision.

In some embodiments, by valid target object is meant a target object representing a collision threat to the vehicle, i.e. a target object with which there is a risk of collision of the vehicle.

Embodiments of the present invention provide monitoring apparatus for monitoring a target object external to a vehicle. The apparatus is operable to determine whether the target object is a valid target object in dependence on a value of a maximum range $R_{max}$ from the vehicle at which the target object has been detected. The apparatus may be operable to pre-arm a braking system and optionally apply a braking system responsive to a determination that a risk of collision exists.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
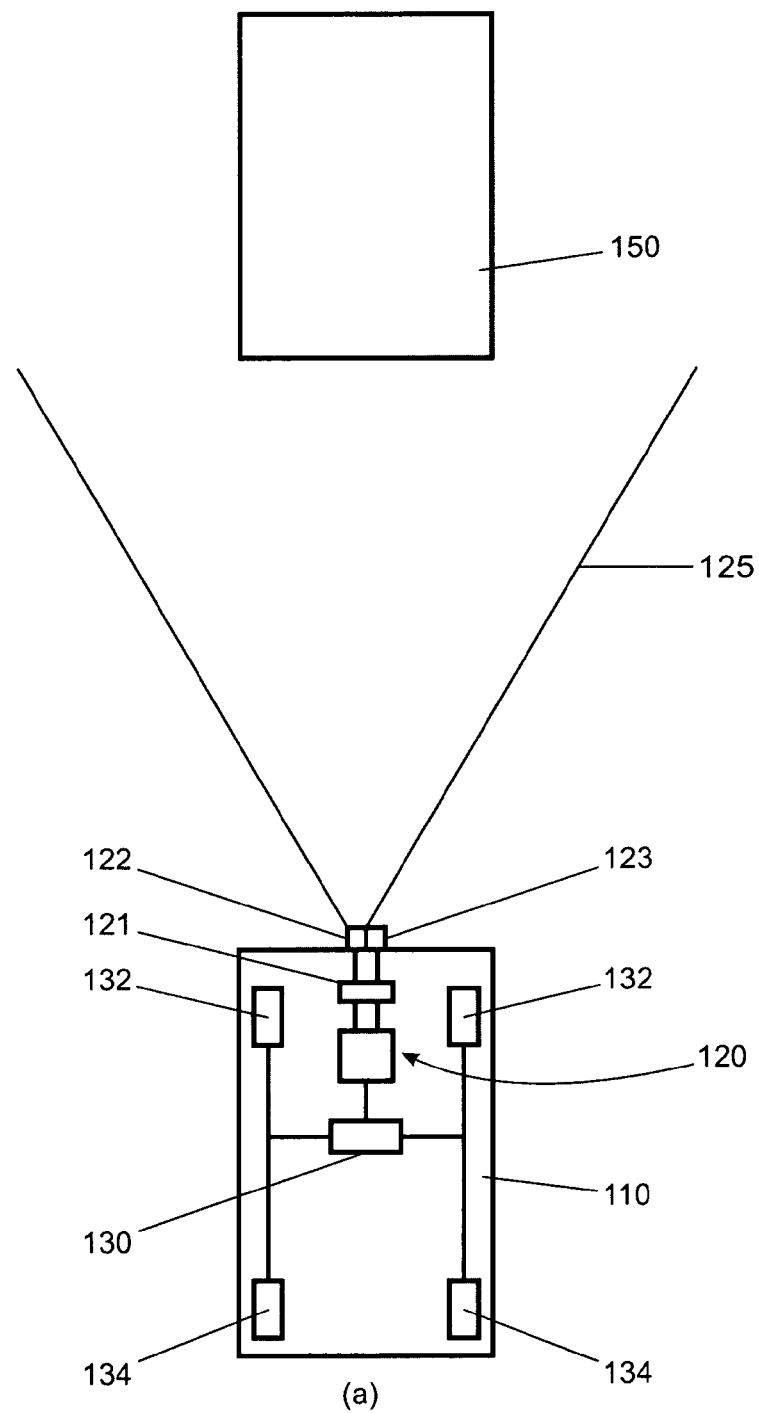
FIG. 1 is a schematic illustration of apparatus according to an embodiment of the present invention installed in a motor vehicle.

In one embodiment of the invention monitoring apparatus 120 is provided in a motor vehicle 110 as shown in FIG. 1. The monitoring apparatus 120 has a radar module 121 arranged to identify the presence of a target object ahead of the vehicle 110 such as a lorry 150. The radar module 121 is arranged to determine the range R of the object from the vehicle 110 and the rate of change of the range of the object R' from the vehicle 110 ('range rate').

The monitoring apparatus 120 is coupled to a brake controller 130 of the vehicle 110, which is in turn arranged to control a braking system of the vehicle 110. The braking system includes a pair of front brakes 132 and a pair of rear brakes 134. The front brakes 132 are arranged to apply a braking action to a pair of front wheels of the vehicle 110 whilst the rear brakes 134 are arranged to apply a braking action to a corresponding pair of rear wheels of the vehicle 110.

The brakes 132, 134 are brakes of the type having a brake pad and a brake disc. Braking action is obtained by urging the brake pad against the brake disc.

The brake controller 130 is operable to control the front brakes 132 and rear brakes 134 to execute a braking action by increasing a pressure of brake fluid in brake fluid lines of the vehicle 110.

It is to be understood that when a pressure of brake fluid in a braking system is increased initially, the brake pad of each brake 132, 134 moves into contact with the corresponding disc of the brake 132, 134.

With further increasing brake fluid pressure the pads are urged against the discs causing the brakes 132, 134 to provide the required braking action.

The monitoring apparatus 120 is arranged to provide first and second alert signals to the brake controller 130 when certain conditions are met.

In response to the first alert signal the brake controller 130 is arranged to execute a brake system pre-arm operation in which the pressure of brake fluid in the braking system is increased to cause the pads of each brake 132, 134 to move into contact with the corresponding disc.

This action does not cause any significant braking action. However if the braking system is subsequently controlled to further increase the pressure of brake fluid in the braking system braking action will be experienced by the vehicle 110 within a shorter time period compared with that in the case that the pre-arm operation is not performed.

In response to the second alert signal the brake controller 130 is arranged to execute a brake activation operation in which the pressure of brake fluid in the braking system is increased to cause braking of the vehicle.

In some embodiments the activation operation is arranged to cause braking of the vehicle for a prescribed time period sufficient to reduce a speed of travel of the vehicle and alert a driver to the presence of a potential collision hazard.

Other arrangements are also useful.

The radar module 121 of the apparatus 120 has a radar transmitter 122 and a radar receiver 123. In the embodiment of FIG. 1 the radar module 121 is a Delphi ESR (electronically scanning radar) module (Delphi, Troy, Mich.).

The radar module 121 is arranged to control the radar transmitter 122 to transmit a radar signal 125 ahead of the vehicle 110. The radar receiver 123 is arranged to detect portions of the radar signal 125 that are reflected back towards the vehicle 110 by objects ahead of the vehicle. The module 121 is configured to determine the range R of the objects ahead of the vehicle by measuring a phase difference between the radar signal 125 transmitted by the transmitter 122 and the signal received by the receiver 123. It is to be understood that in some embodiments a time of flight analysis of the reflected radar signal may be employed to determine the range of objects ahead of the vehicle.

The module 121 is further configured to determine the range rate R' of the objects based on a frequency of the radar signal detected by the receiver 123 relative to that of the radar signal transmitted by the transmitter 122. It is to be understood that the frequency will be different depending on the relative speeds of the vehicle 110 and objects detected by the module 121, a phenomenon known as the 'Doppler effect'.

Each object identified by the radar module 121 (referred to herein as a 'target object') is assigned by the module 121 a 'target identification code' (or 'target ID') number that is unique to that target object. For each target object having a target ID the module 121 determines the range R and range rate R' of that object. The module 121 also sets a target flag status 's' associated with each target ID.

If the target object is a 'new' target object (i.e. the object has had a target ID assigned to it for a period of time that is less than a prescribed time period) the module sets the target flag status to a value s=1.

If after a prescribed time period the new target object is still within the field of view of the radar module 121 the module 121 sets the target flag status to a value s=2.

If the target object is subsequently not detected by the module 121 the module 121 is arranged to set the target flag status to a value s=3. If the target object is subsequently detected once again within a further prescribed period the module 121 changes the target flag status back to the value s=2.

The module 121 is arranged to select one of the detected target objects as a 'target of interest' or TOI being the target object that the module 121 determines represents the greatest collision threat to the vehicle 110. A TOI ID parameter TOI is also set equal to the target ID of the target of interest.

The monitoring apparatus 120 is arranged to receive an input of data from the radar module 121, the data comprising the range, range rate, flag status and target ID of the TOI.

The monitoring apparatus 120 is arranged to determine whether the current TOI meets a set of prescribed conditions qualifying it as a target object that is to be allowed to trigger issuance of the first or second alert signals, that is, pre-arming and/or activation of the vehicle braking system should a further set of conditions be met.

In other words, the monitoring apparatus 120 determines whether the current TOI is a target the behaviour of which is to be allowed to trigger issuance of the first or second alert signals to the brake controller 130. Thus the monitoring apparatus 120 determines whether the current TOI is a TOI that the monitoring apparatus 120 should 'lock on to' and base a decision whether or not to issue the first or second alert signals on the further behaviour of that TOI.

It is to be understood that until a TOI is determined to be a TOI that the monitoring apparatus should lock on to, its behaviour is not permitted to trigger issuance of the first or second alert signals.

It is to be understood that provision of the second alert signal to the brake controller 130 should be made only under exceptional circumstances where it is determined that a risk that the TOI is in fact not a threat to the vehicle 110 is low. This is so as to prevent issuance of the second alert signal when in fact the TOI does not represent a collision hazard to the vehicle or when braking of the vehicle might increase the risk of collision with the TOI.

In the present embodiment the monitoring apparatus 120 is configured to monitor data concerning the TOI provided by the radar module 121 to determine:

1. the length of time t for which the target ID of the TOI has not changed;
2. the maximum range Rmax at which the current TOI has been detected moving;
3. the range rate R' of the TOI; and
4. the target flag status (i.e. the value of s) of the TOI.

The monitoring apparatus 120 is arranged to determine that the TOI is a valid TOI for which the first alert signal may be provided to the brake controller 130 if a set of first alert conditions are met in respect of that TOI. The first alert conditions are as follows:

1. the TOI has been the TOI for at least X1 seconds;
2. the TOI has been detected moving at least a distance R1 max from the vehicle;
3. the range rate R' of the TOI is less than the speed of the vehicle and has been so for at least X1 seconds; and
4. the target flag status has been continuously set to a value s=2 for at least the preceding X1 seconds.

In some embodiments X1 is around 1.8 s and R1max is around 10 meters. It is to be understood that other values are also useful.

Requirements (1) and (2) are placed on the behaviour of the TOI in order to increase the likelihood that the radar signals giving rise to detection of the TOI are signals that have been reflected by a single real object and are not 'artefacts', being reflections that have arisen due for example to spurious reflection from multiple objects.

Requirement (3) is placed on the behaviour of the TOI so that only objects that are moving in a direction away from the vehicle are considered as potential candidates for the apparatus 120 to lock on to.

Requirement (4) is placed on the behaviour of the TOI so that only an object that has remained within the field of view of the radar module 121 for the period of X1s may be considered as a TOI the behaviour of which may give rise to issuance of the first or second alert signal. Thus, a target that has temporarily moved out of the field of view of the vehicle, being referred to as a 'coasted target' may not be considered a TOI the behaviour of which may give rise to issuance of the first or second alert signal unless it has remained continuously within the field of view throughout the preceding X1s.

The monitoring apparatus 120 is arranged to determine that the TOI is a valid TOI for which the second alert signal may be provided to the brake controller 130 if a set of second alert conditions are met in respect of that TOI. The set of second alert conditions are as follows:
1. the TOI has been the TOI for at least X2 seconds;
2. the TOI has been detected moving at least a distance R2max from the vehicle;
3. the range rate R' of the TOI is less than the speed of the vehicle and has been so for at least X2 seconds; and
4. the target flag status has been continuously set to a value s=2 for a period of at least the preceding X2 seconds.

In some embodiments X2 is around 2 s and R2max is around 20 meters. It is to be understood that other values are also useful.

It is to be understood that in this and some other embodiments X2>X1 and R2max>R1max. Thus, the set of second alert conditions are less likely to be met by a TOI than the set of first alert conditions. Furthermore the set of first alert conditions are likely to be met before the set of second alert conditions. This has the advantage that pre-arming of the brake system is likely to occur before the brakes are actually activated, reducing a time delay between issuance of the second alert signal and the provision of braking action on the vehicle 110.

Other values of X2, X1, R2max and R1max are also useful. Other arrangements are also useful.

Figure 2:
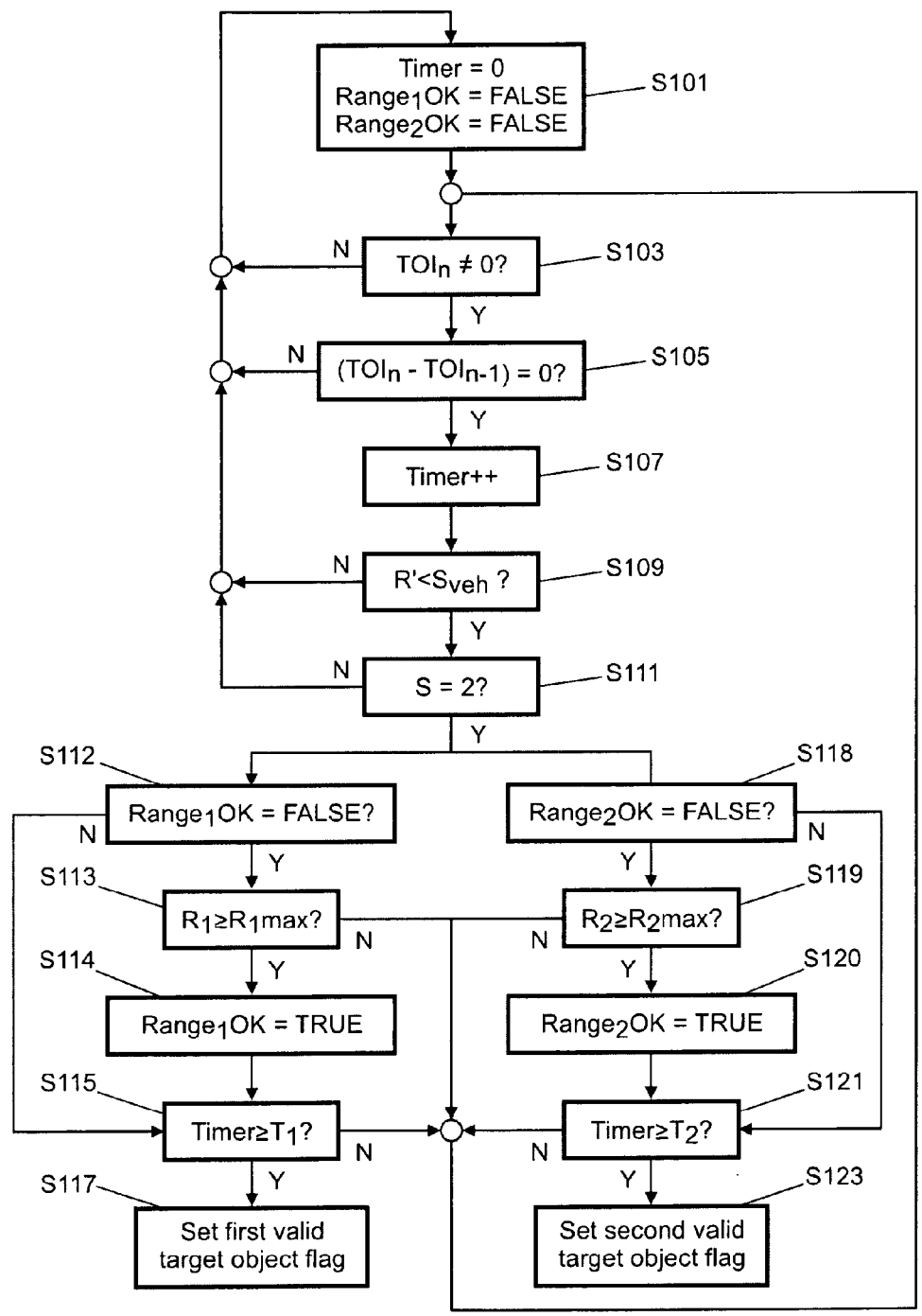
FIG. 2 is a flow chart showing a method according to an embodiment of the invention.

FIG. 2 is a flow diagram of the method of operation of the monitoring apparatus 120 in respect of the determination whether a TOI is to be considered a valid target object.

At step S101 the apparatus 120 resets a timer in order to begin timing of an elapsed period since the counter was reset. The apparatus 120 also sets the value of each of two flags Range1OK and Range2OK to FALSE.

At step S103 the apparatus 120 determines whether or not a TOI currently exists. It is to be understood that a parameter TOIn (where n is the number of the current execution cycle of step S103) will be set to the ID number of the target of interest if a target of interest exists. If no target of interest exists, then the value of TOIn is set to zero.

If a target of interest has not been identified (i.e. parameter TOIn=0) the apparatus 120 continues at step S101.

If a target of interest has been identified, then at step S105 it is determined whether the a target of interest has changed since the last time step S105 was executed. This is achieved by subtracting the current value of the target ID number (TOI$_n$) from the value of the target ID number when step S105 was previously executed (TOI$_{n-1}$). If the TOI has changed the apparatus continues executing at step S101. If the TOI has not changed, the apparatus continues to step S107.

At step S107 the timer is incremented.

At step S109 it is determined whether the value of rate of change of range, R', of the TOI is less than the current speed of the vehicle S$_{veh}$.

If R'<S$_{veh}$ it is determined that the TOI is moving in the same direction as the vehicle and the apparatus 120 continues to step S111. If R' is not less than S$_{veh}$ then the apparatus 120 continues to step S101.

At step S111 it is determined whether the value of parameter s=2. It is to be understood that the value of s will only be set to 2 if the TOI has been in the field of view of the apparatus 120 since the timer was last reset.

If s does not equal 2 then execution continues at step S101.

If s=2 then the apparatus 120 executes two sets of steps, steps S112 to S117 and steps S118 to S123 in parallel with one another.

It is to be understood that in some embodiments the steps are not executed in parallel, but may be executed in series with one another. Other arrangements are also useful.

For example, steps S101 to S111 may be executed followed by steps S112 to S117. Subsequently (or in parallel) steps S101 to S111 and then steps S118 to S123 may be executed.

In the first set of parallel steps, at step S112 it is determined whether the flag Range1OK is set to FALSE. If Range1OK is not set to FALSE, the apparatus continues at step S115.

If the flag Range1OK is set to FALSE the apparatus 120 continues at step S113.

At step S113 it is determined whether the range R1 of the TOI is greater than or equal to a value R1max. If the range is not greater than or equal to R1max the apparatus 120 continues to step S103.

If the range is greater than or equal to R1max the apparatus 120 continues to step S114. It is to be understood that the condition that the range is greater than or equal to R1max corresponds to the determination that the target has been detected a sufficiently large distance from the vehicle to allow setting of the first valid target flag.

Consequently, at step S114 the flag Range1OK is set to TRUE.

At step S115 the apparatus 120 determines whether the timer has reached a value T1. If the timer has not reached the value T1 the apparatus 120 continues executing at step S103.

If the timer has reached a value T1 the apparatus 120 continues to step S117 at which the first valid target object flag is set. Setting of the first valid target object flag allows the apparatus 120 to command the braking system to pre-arm the brakes of the vehicle 110 should conditions so warrant. It is to be understood that the apparatus 120 may be referred to as an intelligent emergency braking system since it is operable automatically to command the brake controller 130 to pre-arm brakes of the vehicle 110 when a risk of collision is considered sufficiently high. As described below, the apparatus 120 is also operable to command the brake controller 130 to apply the brakes when certain further conditions are met.

It is to be understood that the condition that the timer has reached a value T1 corresponds to the determination that the current target has been the TOI for a sufficiently long period to warrant setting of the first valid target object flag.

If the first valid target object flag is not set, the intelligent emergency braking system is not permitted to pre-arm the brakes of the vehicle.

In the second set of parallel steps, at step S118 it is determined whether the flag Range2OK is set to FALSE. If Range2OK is not set to FALSE, the apparatus continues at step 121.

If the flag Range2OK is set to FALSE the apparatus 120 continues at step S119.

At step S119 it is determined whether the range R2 of the TOI from the vehicle is greater than or equal to a value R2max. If the range is not greater than or equal to R2max the apparatus 120 continues to step S103.

If the range is greater than or equal to R2max the apparatus 120 continues to step S120. It is to be understood that the condition that the range is greater than or equal to R2max corresponds to the determination that the target has been detected a sufficiently large distance from the vehicle to warrant setting of the second valid target object flag.

Consequently, at step S120 the flag Range2OK is set to TRUE and the apparatus 120 continues at step S121.

At step S121 the apparatus determines whether the timer has reached a value T2. If the timer has not reached the value T2 the apparatus 120 continues executing at step S103.

If the timer has reached a value T2 the apparatus 120 continues to step S123 at which a second valid target object flag is set indicating that the intelligent emergency braking system is permitted to apply the brakes of the vehicle should conditions so warrant.

It is to be understood that the condition that the timer has reached a value T2 corresponds to the determination that the target has been a TOI for a sufficiently long period to warrant setting of the second valid target object flag.

Thus if the vehicle 110 determines that conditions warrant application of the intelligent emergency braking system to apply the brakes of the vehicle, application of the brakes is permitted.

It is to be understood that if the second valid target object flag is not set, the intelligent emergency braking system is not permitted to apply the brakes of the vehicle to slow or stop the vehicle 110.

It is to be understood that other arrangements are also useful.

It is to be understood that the apparatus 120 is arranged to continue to monitor whether conditions exist for which the first and second valid target object flags may be set.

If the conditions for setting of one or both flags cease to exist then the one or both flags are 'unset' by the apparatus 120. Other arrangements are also useful.

Embodiments of the invention have the advantage that a TOI is required to have been observed at least a distance R1max or R2max from the vehicle 110 before the monitoring apparatus 120 will consider it to be a 'valid target object' being a target object that it will lock on to for further monitoring. Only valid target objects are target objects the behaviour of which may trigger the apparatus 120 to issue the first or second alert signals.

Because of this requirement the risk that the first or second alert signals are issued by the apparatus 120 when the vehicle 110 is not at risk of collision (or 'under threat') may be reduced.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102819.8, filed 18 Feb. 2011, the entire contents of which are expressly incorporated by reference herein.

The invention claimed is:

1. An apparatus for monitoring a target object external to a vehicle, the apparatus comprising a transmitter and a receiver, the apparatus being operable to determine whether the target object is an artefact or a valid target object that is locked onto for further monitoring in dependence on whether a value of a maximum range $R_{max}$ from the vehicle at which the target object has been detected exceeds a first prescribed value.

2. An apparatus as claimed in claim 1, operable to determine whether the target object is a valid target object in further dependence on a determination whether a rate of change of a range of the target object from the vehicle is less than a speed at which the vehicle is moving.

3. An apparatus as claimed in claim 1, arranged to determine whether the target object is a valid target object in further dependence on a length of time t for which the target object has remained a target object.

4. An apparatus as claimed in claim 3, wherein t is the length of time for which the target object has continuously remained a target object.

5. An apparatus as claimed in claim 3, operable to set a first valid target object flag only when t exceeds a first prescribed time value.

6. An apparatus as claimed in claim 1, operable to set a first valid target object flag when $R_{max}$ exceeds the first prescribed value.

7. An apparatus as claimed in claim 6, operable to set a second valid target object flag when $R_{max}$ exceeds a second prescribed value.

8. An apparatus as claimed in claim 7, wherein the second prescribed value of $R_{max}$ is greater than the first prescribed value.

9. An apparatus as claimed in claim 5, operable to set a second valid target object flag only when t exceeds a second prescribed time value.

10. An apparatus as claimed in claim 9, wherein the second prescribed time value is greater than the first prescribed time value.

11. An apparatus as claimed in claim 1, comprising range determination means operable to determine a range of the target object from the vehicle and a rate of change of the range.

12. An apparatus as claimed in claim 1, wherein the transmitter comprises a radar transmitter and the receiver comprises a radar receiver, the apparatus being arranged to determine the range of the target object from the vehicle using a radar signal transmitted from the transmitter and received at the receiver following reflection from the target object.

13. An apparatus as claimed in claim 1, wherein the transmitter comprises an ultrasonic transmitter and the receiver comprises an ultrasonic receiver, the apparatus being arranged to determine the range of the target object from the vehicle using an ultrasonic signal transmitted from the transmitter and received at the receiver following reflection from the target object.

14. A vehicle comprising an apparatus as claimed in claim 1.

15. A vehicle comprising the apparatus of claim 6, wherein if the first valid target object flag is set the vehicle is operable automatically to perform a first set of one or more actions responsive to a determination that a risk of collision exists.

16. A vehicle as claimed in claim 15, wherein the first set of one or more actions includes the action of pre-arming a brake of the vehicle.

17. A vehicle as claimed in claim 15, wherein if a second valid target object flag is set the vehicle is operable automatically to perform a second set of one or more actions responsive to a determination that a risk of collision exists.

18. A vehicle as claimed in claim 17, wherein the second set of one or more actions include the action of applying the brake of the vehicle thereby to slow the vehicle.

19. A method for a vehicle, the method comprising determining whether a detected target object is an artefact or a valid target object that is locked on to for further monitoring in dependence on whether the maximum range $R_{max}$ from the vehicle at which the target object has been detected exceeds a first prescribed value.

20. A method as claimed in claim 19, comprising determining whether a rate of change of a range of the target object from the vehicle is less than a speed at which the vehicle is moving.

* * * * *